United States Patent [19]

Iwamura et al.

[11] Patent Number: 4,717,192
[45] Date of Patent: Jan. 5, 1988

[54] UNIT FOR STORING DEMOUNTABLE ROOF PANEL

[75] Inventors: Tooru Iwamura; Hirokazu Yoshikawa, both of Toyota, Japan

[73] Assignee: Toyota Jidosha Kabushiki Kaisha, Aichi, Japan

[21] Appl. No.: 883,537

[22] Filed: Jul. 9, 1986

[30] Foreign Application Priority Data

Jul. 12, 1985 [JP] Japan .................. 60-106631
Jul. 12, 1985 [JP] Japan .................. 60-106633
Jul. 12, 1985 [JP] Japan .................. 60-106634

[51] Int. Cl.$^4$ .................. B60J 7/20; B60J 7/11
[52] U.S. Cl. .................. 296/37.1; 296/218; 296/224; 224/42.42; 248/223.3; 108/133
[58] Field of Search .......... 296/37.1, 37.8, 37.16, 296/76, 218, 224; 224/42.42, 42.45 R, 311; 248/220.2, 221.3, 222.2, 221.4, 223.3, 288.5, 291, 293; 108/133; 403/328; 211/99

[56] References Cited

U.S. PATENT DOCUMENTS

| | | | |
|---|---|---|---|
| 3,035,815 | 5/1962 | Sparks | 403/328 |
| 3,550,891 | 12/1970 | Scott | 248/291 X |
| 3,635,518 | 1/1972 | Eger | 224/42.45 R X |
| 4,467,944 | 8/1984 | Manko et al. | 296/218 X |

FOREIGN PATENT DOCUMENTS 2557517 7/1985 France .................. 296/37.1
60-65120 5/1985 Japan .
60-65122 5/1985 Japan .

Primary Examiner—Dennis H. Pedder
Attorney, Agent, or Firm—Parkhurst & Oliff

[57] ABSTRACT

A unit for storing a demountable roof panel, wherein movement of the demountable roof panel is controlled by a roof panel fixing device, with which one end edge of the demountable roof panel is engaged, and a roof panel holding device, with which the other end edge of the demountable roof panel is engaged. The demountable roof panel is thereby stored in a storing space of a motor vehicle. The roof panel fixing device includes: a support mounted to an inner peripheral wall of the storing space; a stay pivoted on a rotary shaft to be rotatable about the rotary shaft horizontally provided on the support from a retracted position wherein the stay is substantially close to and parallel to the inner peripheral wall of the storing space to a position where the stay projects into the storing space, to be engaged with a mounting bracket provided at one end edge of the demountable roof panel; and stay fixing means for fixing the stay to the projected positon so that the mounting bracket is engaged with the stay.

20 Claims, 13 Drawing Figures

UNIT FOR STORING DEMOUNTABLE ROOF PANEL

BACKGROUND OF THE INVENTION

1. Field of the Invention

This invention relates to a unit for storing a demountable roof panel, and more particularly to improvements in a unit for storing a demountable roof panel, wherein movements of the roof panel is controlled by a roof panel fixing device, with which one end edge of the demountable roof panel is engaged, and a roof panel holding device, with which the other end edge of the roof panel is engaged, to thereby store the roof panel in a storing space of a motor vehicle.

2. Description of the Prior Art

In the past, a demountable roof (sun roof) has been constructed such that the roof panel is demounted from a roof of a motor vehicle and stored in a case or the like and rested on a rear deck or a rear seat or fixed by use of a belt to the rear deck or the rear seat so as not to move during running of the vehicle. However, in either case, since the roof panel thus demounted is placed in a compartment of the vehicle, such a problem has been presented that the roof panel interferes with an occupant during his getting on or off the vehicle and luggages during loading or unloading. Furthermore, in fixing the roof panel by a belt, disadvantageously, the roof panel is not positively fixed and the reliability of fixing is low.

To obviate the above-described disadvantages, in Japanese Utility Model Laid-Open Nos. 65120/1985 and 65122/1985, as shown in FIGS. 12 and 13, the applicant proposes a roof panel storing unit including a roof panel fixing device 4 having a stay 3, into which a mounting hinge 2 or a mounting bracket is inserted and fixed, and a holding device 6 for holding and fixing a lock handle 5 of the roof panel 1, which is provided at an end edge opposite to the mounting hinge 2 of the roof panel 1, whereby the roof panel 1 is held and stored in a luggage room 7 of a motor vehicle M. Additionally, designated at 4A in the drawing is an engageable portion, with which the mounting hinge 2 of the roof panel 1 is coupled and engaged, and 4B a shock absorbing member made of rubber or synthetic resin, for preventing an inner panel of the roof panel 1 from being directly abutted against the stay 3 and damaged.

However, the stay 3 of the fixing device 4 in the above proposal is of a fixed type and projects into a luggage room 7, and, when the fixing device 4 is secured to a lower back reinforcement at the rear portion of a rear deck, such a disadvantage is presented that the projected stay 3 interferes with the loading or unloading of luggages and the volume of the luggage room 7 is decreased.

To obviate the above-described disadvantage, there may be a case where the roof panel fixing device consists of a support and a stay, and the stay is rotatably connected to the support, whereby the roof panel fixing device as a whole is made foldable.

More specifically, there may be the case where the roof panel fixing device includes: a support mounted to the inner peripheral wall of the storing space; a stay pivoted to be rotatable about a rotary shaft horizontally provided on the support within a scope from a retracted position where said stay is substantially closely attached to the inner peripheral wall of the storing space to a position where the stay projects into the storing space from the retracted position, and engageable with one end edge of the demountable roof panel; an engaging rod provided on the support in a manner to be movable and resiliently urged toward a rotary shaft of the stay; a first engageable hole formed on the outer periphery of an insertion portion for receiving the rotary shaft of the stay and engaged with the forward end portion of the engaging rod when the stay reaches a position where the stay is engaged with the demountable roof panel; and a second engageable hole, with which the forward end portion of the engaging rod is engaged when the stay is folded and comes to be along the inner peripheral wall of the storing space.

In this arrangement, when the stay is stored, a control knob connected to the stay is pulled up and the engagement between the engaging rod and the engageable hole is released to rotate the stay. As a consequence, since the operation of pulling up the control knob for releasing the engagement and the operation of rotating the stay are needed, such disadvantages are presented that much labor is needed and the demountable roof panel fixing device cannot be easily operated in one-touch manner.

Additionally, as shown in FIG. 13, the holding unit 6 includes: a base 6A fixed to the inner peripheral wall of a luggage room 7 through a bolt, not shown, so as to clamp the lock handle 5 of the roof panel,; a sheet spring-shaped arm 6C opposed to the bottom of the base 6A and rotatably connected to on one end portion of the base 6A in the widthwise direction through a pin 6B, for clamping the lock handle 5 in cooperation with the base 6A; and a handle 6E rotatably connected to the other end portion of the base 6A in the widthwise direction through a pin 6B, for holding the arm 6C in the locked state. As a consequence, in order to store the roof panel 1 in the luggage room 7, it is necessary to hold the lock handle 5 of the roof panel 1 in the locked state by the handle 6E, whereby locking operation by the handle 6E is needed. Because of this, such a problem is raised that the roof panel 1 cannot be easily stored in one-touch manner.

SUMMARY OF THE INVENTION

It is the object of the present invention to provide a unit for storig a demountable roof panel, wherein storing operation to store the demountable roof panel can be easily performed in one-touch manner, and moreover, the roof panel during storing can be positively held.

It is another object of this invention to provide a unit for storing a demountable roof panel, wherein reduction in the luggage space due to the presence of the fixing device of the storing unit when the demountable roof is not stored is minimized, loading or unloading of the luggages is prevented from becoming ineffective, and moreover, appearance and material quality of the fixing device when the demountable roof panel is not stored is improved.

It is a further object of this invention to provide the unit for storing the demountable roof panel, wherein stay rotating operation for storing the roof panel can be performed in one-touch manner.

To achieve the above-described object, the present invention contemplates a unit for storing a demountable roof panel, wherein movements of the demountable roof panel is controlled by a roof panel fixing device, with which one end edge of the demountable roof panel is engaged and a roof panel holding device, with which the other end edge of the demountable roof panel is engaged, to thereby store the demountable roof panel in a storing space of a motor vehicle, the roof panel fixing device including: a support mounted to the inner peripheral wall of the storing space; a stay pivoted to be rotatable about a rotary shaft horizontally provided on the support from a retracted position where the stay is substantially close to and parallel to the inner peripheral wall of the storing space to a position where the stay projects into the storing space from the retracted position, and engaged with one end edge of the demountable roof panel; and means for fixing the stay to the projected position so that one end edge of the demountable roof panel is engaged with the stay.

To the above end, the present invention contemplates that said stay fixing means includes:

an engaging rod provided to be movable and resiliently urged toward the rotary shaft of said stay; and an insertion portion for receiving the rotary shaft of said stay is provided with a first engageable hole formed on its outer periphery for engaging a forward end of the engaging rod when said stay reaches a position where said stay is engaged with a portion of said demountable roof panel.

To the above end, the present invention contemplates that said insertion portion for receiving the rotary shaft of said stay is provided with a second engageable hole, with which the forward end portion of said engaging rod is engaged when said stay reaches a position where said stay is close to and substantially parallel to the inner peripheral wall of said storing space.

To the above end, the present invention contemplates that the outer peripheral surface of said rotary shaft insertion portion of said stay, extending from the second engageable hole to the first engageable hole is formed to provide a moderately inclined surface so that the forward end portion of said engaging rod can run thereon when said stay rotates relative to said engaging rod from the second engageable hole to the first engageable hole.

To the above end, the present invention contemplates that said demountable roof panel is provided with a mounting bracket mounted at a portion close to an end portion thereof, disposed substantially horizontally to the surface of said demountable roof panel and shifted downwardly of the surface of said demountable roof panel;

said roof panel fixing device includes the stay mounted to the inner peripheral wall of the storing space so as to project into the storing space, said stay having an abutting contact portion, against which the undersurface of said demountable roof panel is abutted, and a mounting bracket engageable portion, with which said mounting bracket is engaged;

said mounting bracket engageable portion of said stay includes a lateral movement control wall for controlling the movement of the mounting bracket in the direction of the inner peripheral wall of the storing space (e.g., in the widthwise direction of the vehicle body), a longitudinal movement control wall for controlling movement of the mounting bracket in the longitudinal direction (e.g., rearward direction) of the vehicle, an upward movement control wall extended from the top portion of the longitudinal movement control wall and projected to the center of said demountable roof panel, and a mounting bracket guide wall extended from the top portion of the lateral movement control wall and the upward movement control wall and having an inclined surface, on which the forward end of the mounting bracket slides to move said demountable roof panel in the direction toward the roof panel holding device when the mounting bracket is urged downwardly.

To the above end, the present invention contemplates that said roof panel holding device including an urging member held on the inner peripheral wall of the storing space in a manner to be movable in a direction of the roof panel fixing device, coupled into a mounting cutout of the demountable roof panel to control the movement of the demountable roof panel in the vertical direction, and resiliently urging the demountable roof panel in the direction toward the roof panel fixing device.

To the above end, the present invention contemplates that said roof panel holding device includes a guide mechanism for guiding said urging member in a manner to be linearly movable toward said roof panel fixing device, and a spring for biasing said urging member in a direction of the projected forward end thereof, said urging member having a shoe coupled into the mounting cutout of said roof panel to be engaged therewith.

To the above end, the present invention contemplates that said guide mechanism has a slot elongately formed in said urging member in a direction of urging and two guide pins inserted through the slot of said urging member to slidably hold said urging member on the side of the inner peripheral wall of said storing space.

To the above end, the present invention contemplates that said slot is extended through said urging member in the widthwise direction relative to the moving direction of said urging member, and said two guide pins are provided in the widthwise direction of said urging member and an axial line passing through said two guids pins is disposed in parallel to and spaced apart from the moving direction of said urging member.

To the above end, the present invention contemplates that, out of said two guide pins, one on the side of said roof panel fixing device is shifted to a position higher than the other, whereby said urging member moves obliquely upwardly in the direction of the roof panel fixing device.

To the above end, the present invention contemplates that said roof panel holding device comprises a case secured to the inner peripheral wall of said storing space of a substantially U-shape in vertical cross section, said case extends in the direction toward said roof panel fixing device, said two guide pins cross said case and are secured thereto, and said urging member is slidably coupled into said case.

To the above end, the present invention contemplates that said urging member has a spring engageable stepped portion projected downwardly of said slot into said case, and said spring is provided between said engageable stepped portion and said inner peripheral wall portion adjacent the bottom of said case.

DETAILED DESCRIPTION OF THE PREFERRED EMBODIMENTS

Figure 1:
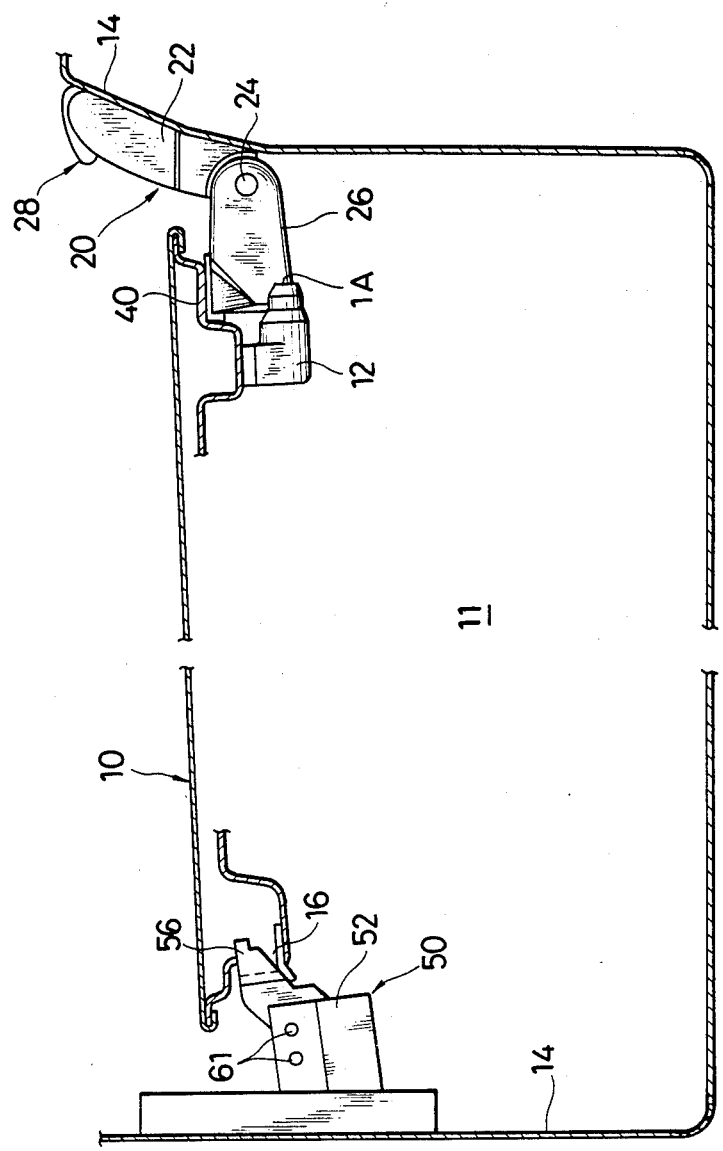
FIG. 1 is a side view showing one embodiment of the unit for storing the demountable roof panel according to this invention.

The embodiments of the present invention will hereunder be described with reference to the accompanying drawings.

As shown in FIGS. 1 to 10, according to this embodiment, in a unit for storing a demountable roof panel 10, wherein movements of the demountable roof panel 10 is controlled by a roof panel fixing device 20, with which a mounting bracket 12 at one end edge of the demountable roof panel 10 is engaged, and a roof panel holding device 50, with which the other end edge of the demountable roof panel 10 is engaged, to thereby store the demountable roof panel 10 in a storing space 11 of a motor vehicle, said roof panel fixing device 20 includes:

a support 22 mounted to an inner peripheral wall 14 of the storing space 11;

a stay 26 pivoted on a rotary shaft 24 to be rotatable about the rotary shaft 24 horizontally provided on the support 22 within a scope from a retracted position substantially closely attached to the inner peripheral wall 14 of the storing space 11 to a position projected into the storing space 11, and engaged with the mounting bracket 12 provided at one end edge of the demountable roof panel 10; and stay fixing means 28 for fixing the stay 26 to the projected position so that the mounting bracket 12 is engaged with the stay 26.

Figure 3:
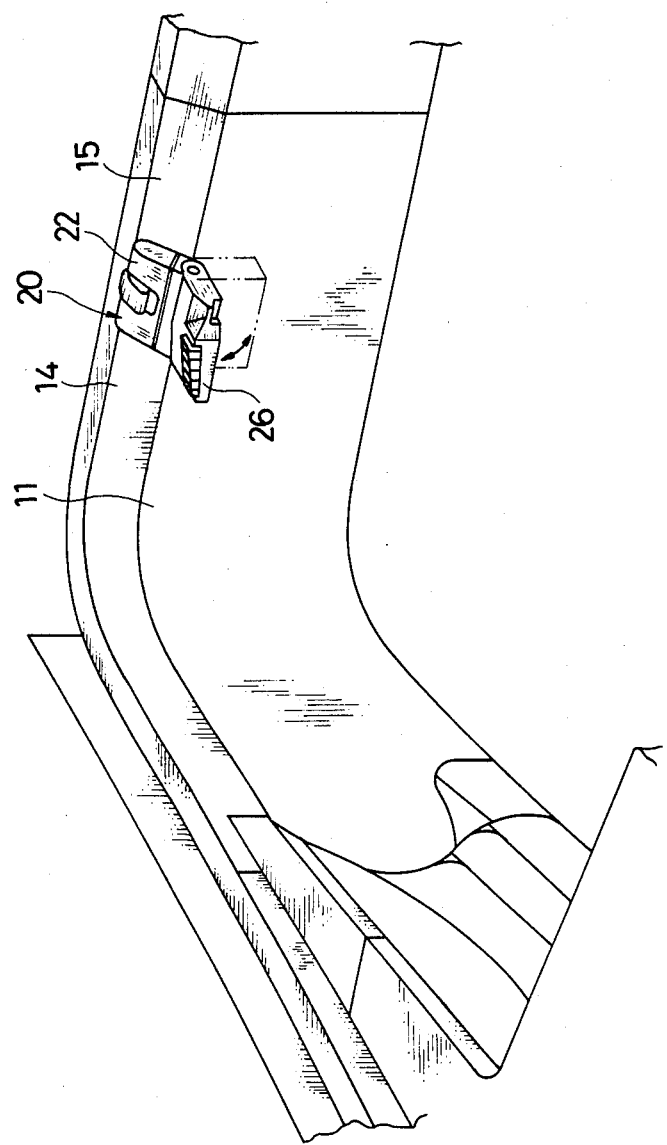
FIG. 3 is a perspective view showing the position where the roof panel fixing device is mounted.
Figure 4:
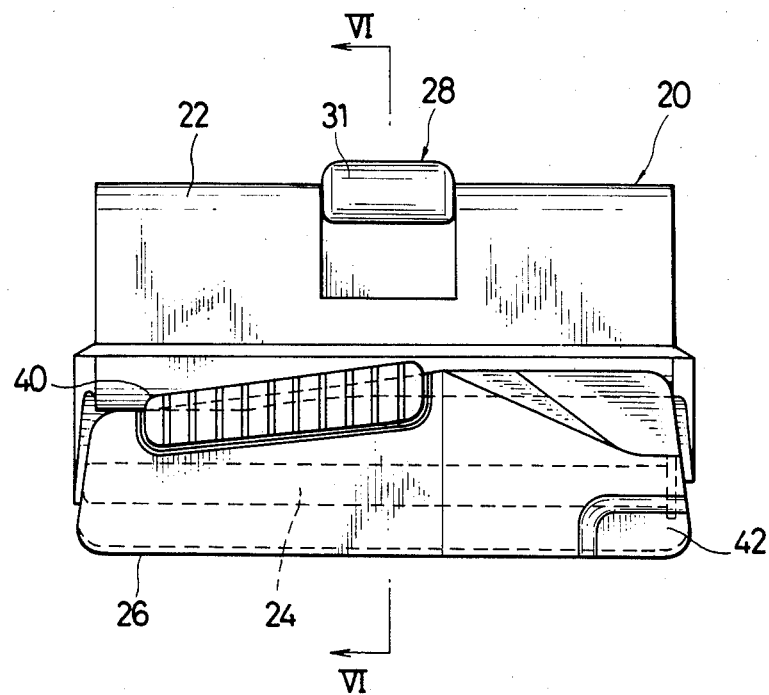
FIG. 4 is a front view showing the roof panel fixing device.

As shown in FIG. 3, a pair of the roof panel fixing devices 20 are provided on a lower back reinforcement 15 in the rear portion of a rear deck of a vehicle body bisymmetrically with respect to a center line in the widthwise direction of the vehicle body.

Figure 2:
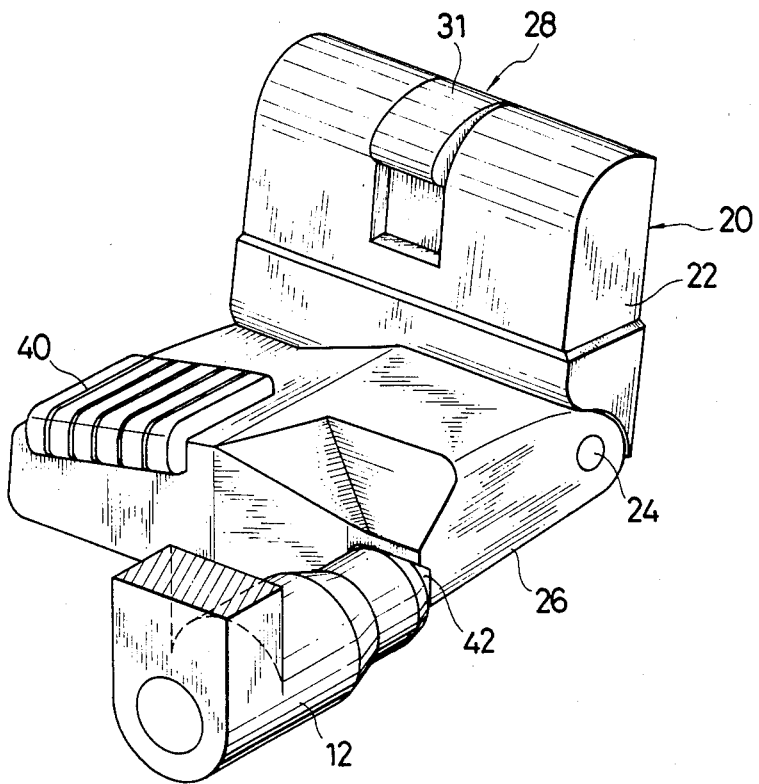
FIG. 2 is a perspective view showing the roof panel fixing device in the above embodiment.
Figure 5:
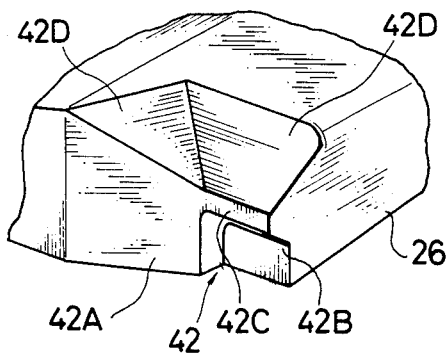
FIG. 5 is a perspective view showing the mounting bracket engaged portion on the stay.

As shown in FIGS. 2 and 5, the stay 26 is formed thereon with: a roof panel contact portion 40, against which the undersurface of the demountable roof panel 10 is abutted; and a mounting bracket engageable portion 42 for controlling movements of the mounting bracket 12 in the upward, rearward and lateral directions thereof.

The roof panel contact portion 40 is provided at the upper portion of the stay 26 and formed of a shock absorbing member made of rubber or synthetic resin so as not to damage the undersurface of the demountable roof panel 10. Furthermore, the mounting bracket 12 is formed at the forward end 12A thereof with a tapered surface.

Furthermore, the mounting bracket engageable portion 42 is formed on the inner end of the stay 26 in the widthwise direction of the vehicle body as shown in FIG. 5, and includes: a lateral movement control wall 42A for controlling the movement of the mounting bracket 12 of the demountable roof panel 10 in the widthwise direction of the vehicle body; a longitudinal (e.g., rearward) movement control wall 42B for controlling the movement of the mounting bracket 12 in the longitudinal (rearward) direction of the vehicle body; an upward movement control convex wall 42C extended from the top portion of the longitudinal (rearward) movement control wall 42B, for controlling the upward movement of the mounting bracket 12; and a mounting bracket guide wall 42D extended from the top portions of the lateral movement control wall 42D and the upward movement control convex wall 42C and progressively flared upwardly.

Figure 6:
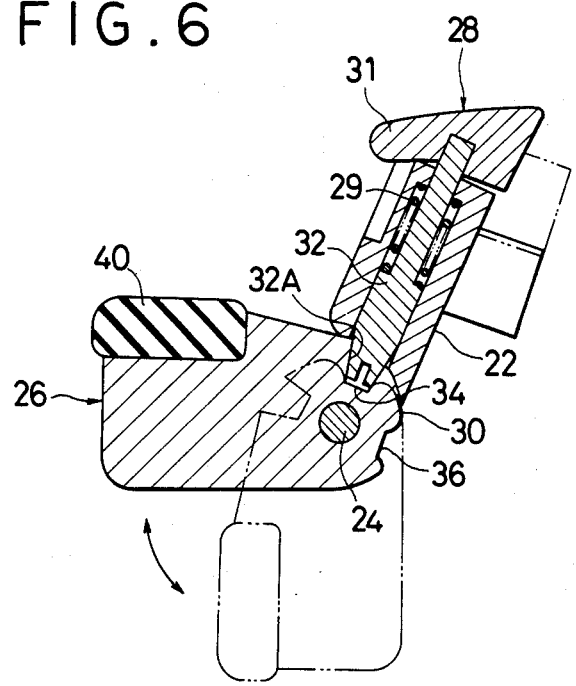
FIG. 6 is a sectional view taken along the line VI—VI in FIG. 4, showing the means for fixing the stay.

As shown in FIG. 6, the stay fixing means 28 includes: a tapered engaging rod 32 provided on the support 22 in a manner to be movable toward the rotary shaft 24 of the stay 26 and to be resiliently urged by a coil spring 29; a control knob 31 secured to the top end of the engaging rod 32; a first engageable hole 34 formed on the outer periphery of an insertion portion 30, through which the rotary shaft of the stay 26 is inserted, for being engaged with a forward end portion 32A of the engaging rod 32 when the stay 26 reaches a position where the stay 26 is engaged with the mounting bracket 12 of the demountable roof panel 10; and a second engageable hole 36 formed on the outer periphery of the insertion portion 30 for receiving the rotary shaft 24 of the stay 26, with which the forward end portion 32A of the engaging rod 32 is engaged when the stay 26 reaches a position where the stay 26, under the force of gravity, comes to be along and substantially parallel to the inner peripheral wall 14 of the sotring space 11 (Refer to two-dot chain lines in FIG. 6). The first and second engageable holes 34 and 36 each have shape complementary to the shape of the forward end portion 32A of the engaging rod 32. In other words, the first and second engageable holes 34 and 36 are each formed to provide a conical or pyramidal holes progressively decreased in opening area toward the bottom thereof. The second engageable hole 36 is shallower than the first engageable hole 34.

Figure 7:
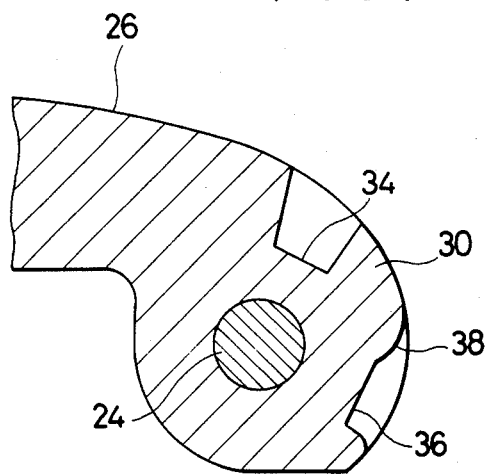
FIG. 7 is a sectional view showing the portion, through which the rotary shaft of the stay is inserted.

As shown in FIG. 7, the outer peripheral surface of the rotary shaft insertion portion 30 of the stay 26, extending from the second engageable hole 36 to the first engageable hole 34 is formed to provide a moderately inclined cam surface 38 so that the forward end portion 32A of the engaging rod 32 can run thereon when the stay 26 rotates in the clockwise direction in the drawing.

Figure 8:
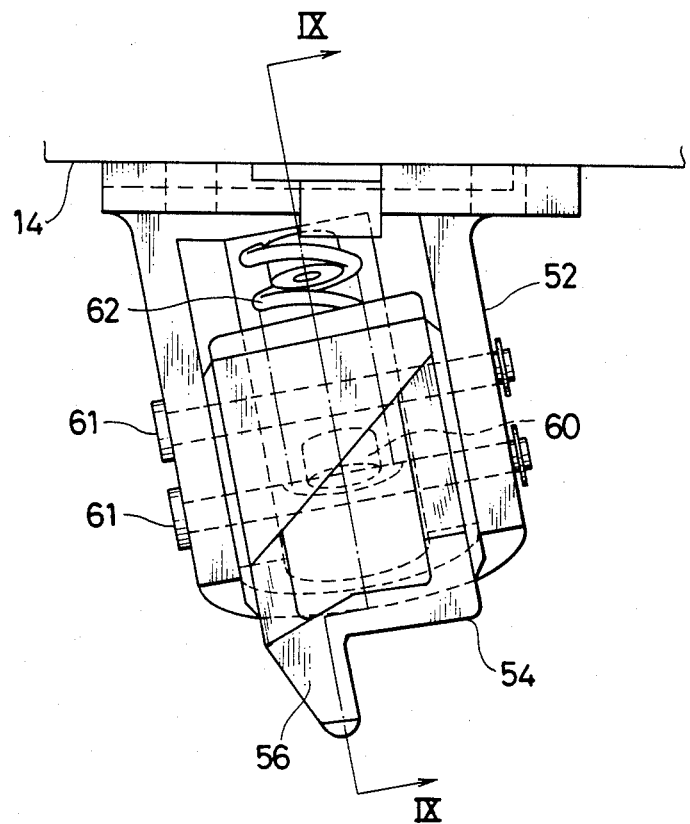
FIG. 8 is a plan view showing the roof panel holding device.
Figure 9:
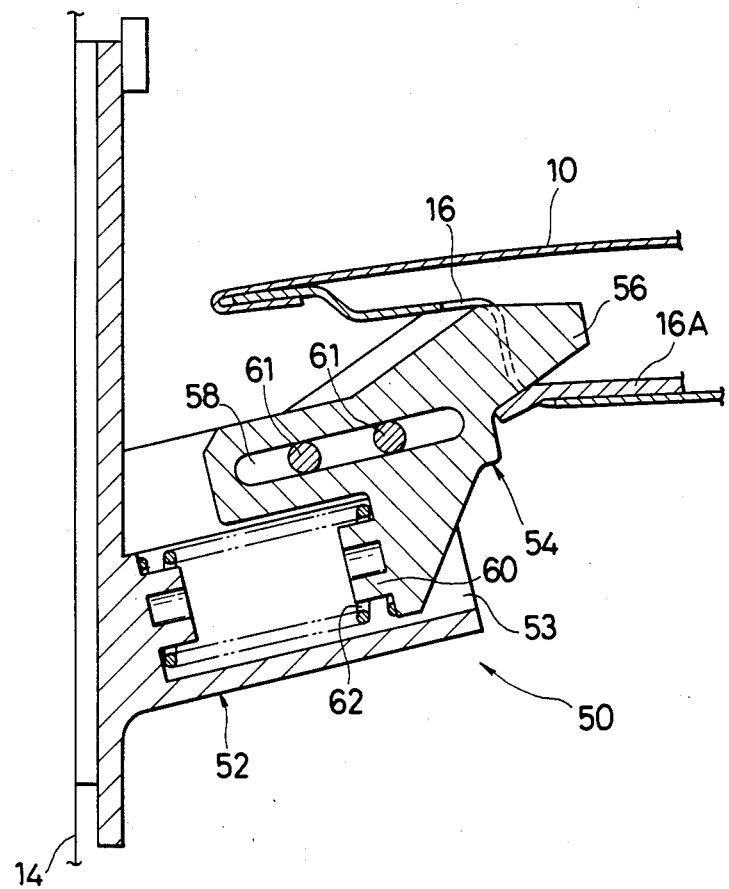
FIG. 9 is a sectional view taken along the line IX—IX in FIG. 8.

As shown in FIGS. 8 and 9, the roof panel holding device 50 includes: a case 52 secured to the inner peripheral surface 14 of the storing space 11, opposed to the roof panel fixing device 20; and an urging member 54 movable held by the case 52 in the direction of the roof panel fixing device 20, coupled at one end thereof into a mounting cutout 16 of the demountable roof panel 10 to control the movement of the demountable roof panel 10 in the vertical direction and resiliently urging the demountable roof panel 10 in the direction of the roof panel fixing device 20. In FIG. 9, designated at 16A is a guide being in abutting contact with the undersurface of a shoe 56.

The urging member 54 is provided at the forward end thereof with the shoe 56 coupled into the mounting cutout 16 of the demountable roof panel 10 and engaged therewith, and further, includes a slot 58 elongately formed in a direction of urging and a coil spring engageable stepped portion 60 projected downwardly from the slot 58. Furthermore, the case 52 is U-shape in cross-section. Two guide pins 61 cross the space 53 within the case 52, and extend through the slot 58 of the urging member 54 to thereby slidably mount the urging member 54 to the case 52. A coil spring 62 is engaged at one end thereof with the case 52 and at the other end with the coil spring engageable stepped portion 60 of the urging member 54 to thereby urge the coil spring engageable stepped portion 60 outwardly.

Action of this embodiment will hereunder be described.

As shown in FIG. 6, to store the demountable roof panel 10, the stay 26 of the roof panel fixing device 20 is rocked about the rotary shaft 24 upwardly to the extend where the stay 26 is held generally horizontally. Due to this upward rocking of the stay 26, the forward end portion 32A of the engaging rod 32 of the stay fixing means 28 is inserted and coupled into the first engageable hole 34 by the resilient force of the coil spring 29, whereby the stay 26 is held horizontally to be generally perpendicular to the support 22, so that the demountable roof panel 10 is brought into a state of being storable.

Figure 10:
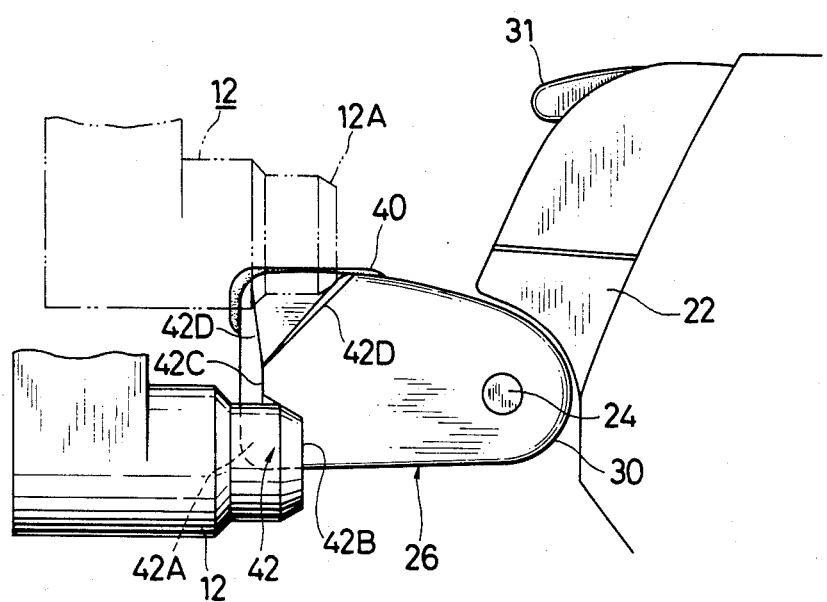
FIG. 10 is a side view showing the engagement between the mounting bracket of the demountable roof panel and the stay.

Subsequently, as shown in FIG. 1, the shoe 56 of the roof panel holding device 50 is positioned with the mounting cutout 16 of the demountable roof panel 10 and the shoe 56 is coupled into the mounting cutout 16. Thereafter, the demountable roof panel 10 is driven forwardly against the resilient force of the coil spring 62 in the case 52 to urge the urging member 54. In this case, the end edge of the demountable roof panel 10 on the side of the roof panel fixing device 20 is pushed downwardly, whereby the mounting bracket 12 of the demountable roof panel 10 is engaged with the mounting bracket engageable portion 42 of the stay 26. As shown in FIG. 10, at this time, when the end edge of the demountable roof panel 10 on the side of the fixing device 20 is urged downwardly, first, a forward end 12A of the mounting bracket 12 is guided by the mounting bracket guide wall 42D of the mounting bracket engageable protion 42 to move downwardly, further, runs on the upward movement control convex wall 42C and positioned and fixed into the mounting bracket engageable portion 42, in which the forward end 12A of the mounting bracket 12 is surrounded by the vertical movement control convex wall 42C, the lateral movement control wall 42A and the longitudinal (e.g., rearward) movement control wall 42B so as to be controlled in its movement in the three directions.

As a consequence, in this embodiment, the demountable roof panel 10 can be easily stored in the storing space 11 by such an operation that the shoe 56 is coupled into the mounting cutout 16, and thereafter, the rear end edge of the demountable roof panel 10 is merely pushed downwardly. To remove the demountable roof panel 10 from the storing space 11, the preceding steps are reversed.

When the demountable roof panel 10 is not to be stored, the control knob 31 of the roof fixing device 20 is pulled up. With this operation, the forward end portion 32A of the engaging rod 32 is removed from the first engageable hole 34 of the stay 26, so that the stay 26 can rock about the rotary shaft 24 by gravity. With this operation, the roof panel fixing device 20 can be folded in one-touch manner at the position where the stay 26 is substantially closely positioned and parallel to the inner peripheral wall 14 of the storing space 11. As a consequence, when the demountable roof panel 10 is not stored, the stay 26 does not project into the luggage space, whereby no interference with the loading or unloading occurs, and the stay 26 does not remain projected into the luggage space, thus preventing the luggage space from being decreased.

Moreover, the forward end portion 32A of the engaging rod 32 is engaged with the second engageable hole 36 when the stay 26 reaches the position where the stay 26 comes to be along and parallel to the inner peripheral wall 14 of the sotring space 11, so that the stay 26 can be removably fixed when the stay 26 is folded.

Further, the second engageable hole 36 is shallower than the first engageable hole 34, so that the resilient force of the coil spring 29 when the engaging rod 32 is engaged with the second engageable hole 36 can be made larger than the resilient force when the engaging rod 32 is engaged with the first engageable hole 34. As a consequence, the stay 26 can be stably fixed to the support 22 in the folded state by the resilient force of the coil spring 29 when the engaging rod 32 is engaged with the first engageable hole 34. Because of this the stay 26 has a no looseness on the rotary shaft 24, thereby eliminating noises.

The outer peripheral surface of the rotary shaft insertion portion 30 of the stay 26, extending from the second engagement hole 36 to the first engageable hole 34, is formed to provide a moderately inclined cam surface 38, whereby the forward end portion 32A of the engaging rod 32 runs thereon when the stay 26 rotates from the state, where the engaging rod 32 is engaged with the stay second engageable hole 36, to the clockwise direction in FIGS. 6 and 7. As a consequence, when the stay 26 is lifted upwardly to be held substantially horizontally in order to store the demountable roof panel 10, the control knob 31 need not be urged upwardly to remove the forward end portion 32A of the engaging rod 32 from the second engageable hole 36. The forward end portion 32A is removed from the second engageable hole 36 due to the function of the moderately inclined surface 38, so that the stay 26 can be easily brought into the state where the demountable roof panel 10 is stored.

In the above embodiment, the first engageable hole 34 is formed to provide a conical or pyramidal hole progressively decreased in opening area toward the bottom thereof, and the forward end portion 32A of the engaging rod 32 has the shape complementary to the shape of the engageable hole 34, so that the stay 26 can be positively fixed to the support 22 without causing coupling looseness between the engaging rod 32 and the first engageable hole 34.

The roof panel holding device 50 is provided with the urging member 54 for resiliently urging the demountable roof panel 10 in the direction of the roof panel fixing device 20, so that the holding device 50 can cooperate with the roof panel fixing device 20 in fixedly holding the demountable roof panel 10 in the storing unit not to move in the longitudinal, vertical and lateral directions.

Furthermore, provision of the tapered surface at the forward end 12A of the mounting bracket 12 of the demountable roof panel 10 makes it possible to more easily perform the moving guide by the mounting bracket guide wall 42D for engaging the mounting bracket 12.

Figure 11:
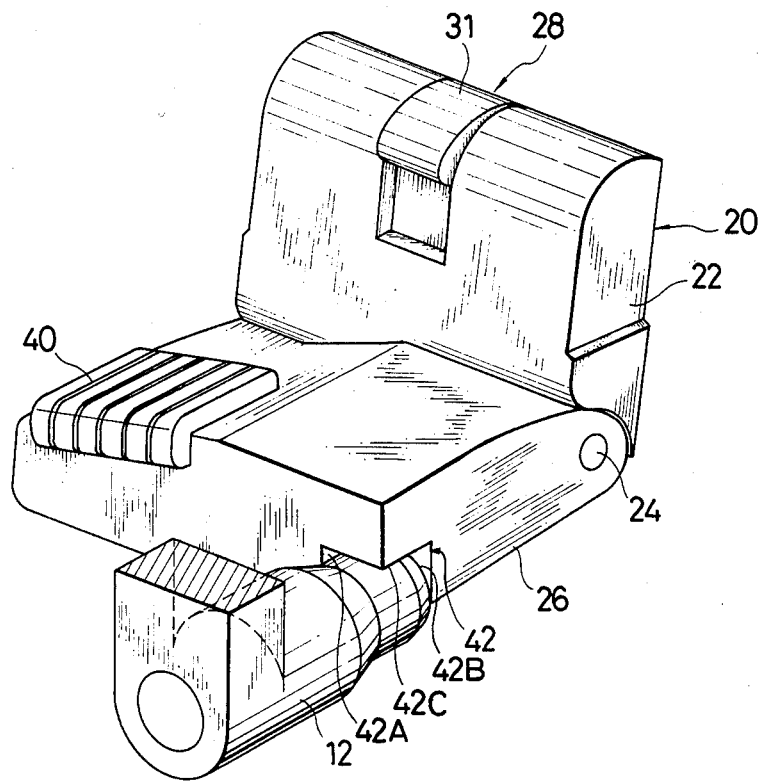
FIG. 11 is a perspective view showing the roof panel fixing device in a second embodiment.
Figure 12:
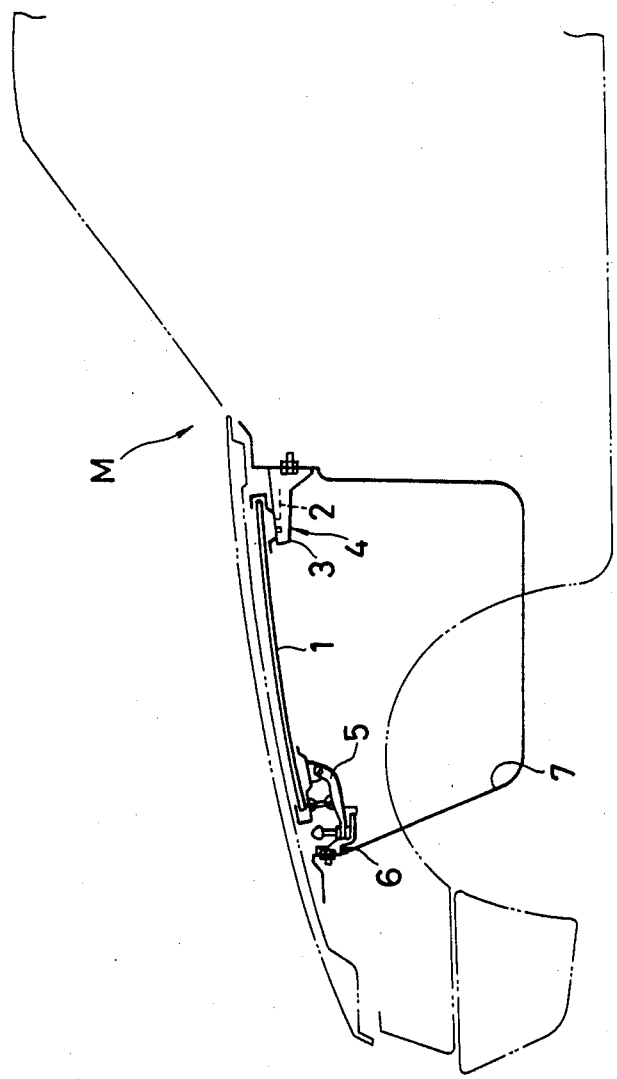
FIG. 12 is a side view showing the conventional unit for storing the demountable roof panel.
Figure 13:
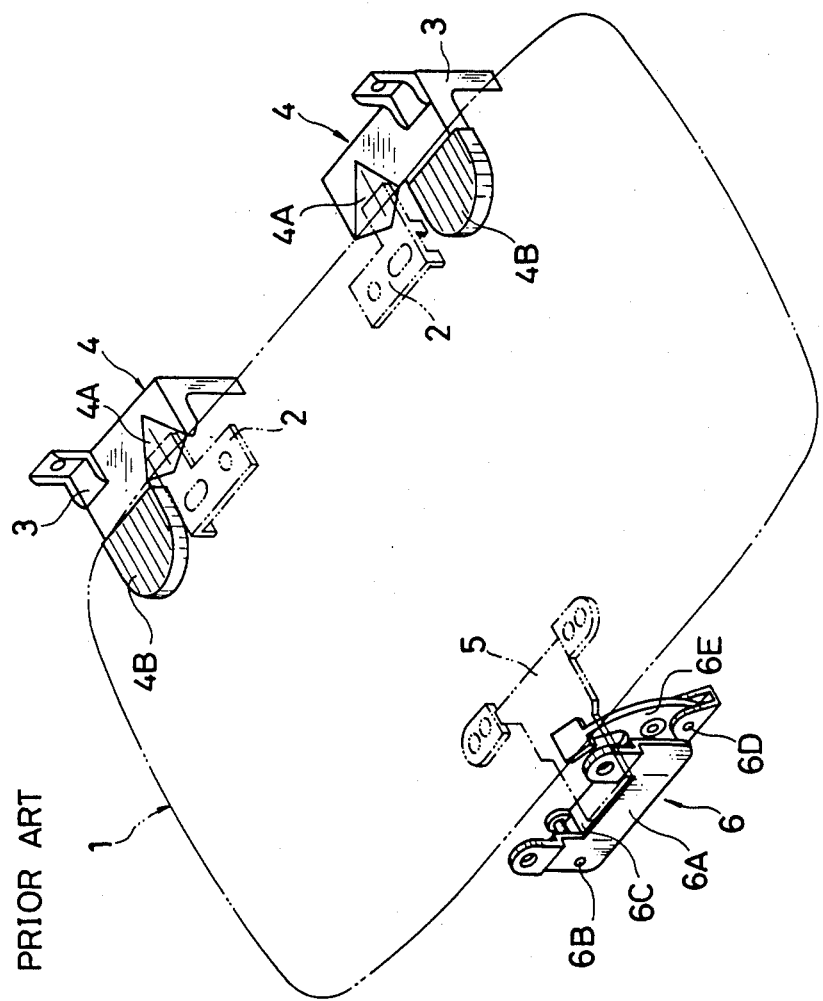
FIG. 13 is a perspective view thereof.

In the above embodiment, the mounting bracket engageable portion 42 of the stay 26 is formed such that the mounting bracket guide wall 42D is extended from the top portions of the lateral movement control wall 42A and the upward movement control convex wall 42C, however, the present invention need not necessarily be limited to this, and, for example, as shown in FIG. 11, such a simplified arrangement may be adopted that the mounting bracket engageable portion 42 is formed merely by the lateral movement control wall 42A, the rearward movement control wall 42B and the upward movement control convex wall 42C. Further, the mounting bracket engageable portion 42 may be formed to provide a coupling hole, into which the mounting hinge of the roof panel 10 is coupled.

Furthermore, if the roof panel holding device 50 is provided for controlling the movement of the demountable roof panel 10 in the lateral direction thereof, then the lateral movement control wall 42A in the mounting bracket engageable portion 42 may be dispensed with.

Additionally, in the above embodiment, the roof panel holding device 50 is provided with the urging member 54 for resiliently urge the demountable roof panel 10 in the direction toward the roof panel fixing device 20, however, the present invention need not necessarily be limited to this, and, for example, such an arrangement may be adopted that the lock handle of the demountable roof panel is fixed as proposed in the aforesaid Patent Laid-Open (Kokai) No. 65122/1985, etc.

What is claimed is:

1. A unit for storing a demountable roof panel, wherein movement of said demountable roof panel is controlled by a roof panel fixing device, with which one end edge of said demountable roof panel is engaged, and a roof panel holding device, with which another end edge of said demountable roof panel is engaged, to thereby store said demountable roof panel in a storing space of a motor vehicle, said roof panel fixing device including:
   a support mounted to an inner peripheral wall of the storing space;
   a stay pivoted on a rotary shaft to be rotatable about the rotary shaft horizontally provided on the support from a retracted position wherein said stay is substantially parallel to the inner peripheral wall of the storing space, to a position where said stay projects into the storing space and is engageable with a mounting bracket provided at one end edge of said demountable roof panel; and
   stay fixing means including a movable member carried by said support and engageable with said stay for fixing the stay in the projected position so that the mounting bracket is engageable with said stay, said stay fixing means being releasable, whereby upon release said stay falls under the force of gravity to said retracted position.

2. The unit for storing a demountable roof panel as set forth in claim 1, wherein said movable member comprises an engaging rod provided to be resiliently urged toward the rotary shaft of said stay, and said stay fixing means further includes a first engageable hole formed on the outer periphery of an insertion portion mounting said rotary shaft of said stay, said hole for engaging a forward end portion of said engaging rod when said stay reaches a position where said stay is engageable with a portion of said demountable roof panel.

3. The unit for storing a demountable panel roof as set forth in claim 2, wherein said insertion portion for receiving the rotary shaft of said stay is provided with a second engageable hole, with which the forward end portion of said engaging rod is engaged when said stay reaches said retracted position.

4. The unit for storing a demountable roof panel as set forth in claim 3, wherein the outer peripheral surface of said rotary shaft insertion portion of said stay, extending from the second engageable hole to the first engageable hole, is formed to provide a moderately inclined cam surface so that the forward end portion of said engaging rod can run thereon when said stay rotates relative to said engaging rod from the second engageable hole to the first engageable hole.

5. The unit for storing a demountable roof panel as set forth in claim 1, wherein:
   said demountable roof panel is provided with a mounting bracket mounted adjacent to an end portion thereof, disposed substantially parallel to the surface of said demountable roof panel and shifted downwardly of the surface of said demountable roof panel;
   said stay has an abutting contact portion, against which the undersurface of said demountable roof panel may be abutted, and a mounting bracket engageable portion, with which said mounting bracket is engageable;
   said mounting bracket engageable portion of said stay includes a lateral movement control wall for controlling the movement of the mounting bracket in the direction of the inner peripheral wall of the storing space, a longitudinal movement control wall for controlling movement of the mounting bracket in a longitudinal direction of the vehicle, an upward movement control wall extended from the top portion of the longitudinal movement control wall and projected to the center of said demountable roof panel, and a mounting bracket guide wall extended from the top portion of the upward movement control wall and having an inclined surface, on which the forward end of the mounting bracket slides to move said demountable roof panel in a direction toward the roof panel holding device when the mounting bracket is urged downwardly.

6. The unit for storing a demountable roof panel as set forth in claim 2, wherein:
   said demountable roof panel is provided with a mounting bracket mounted adjacent to an end portion thereof, disposed substantially parallel to the surface of said demountable roof panel and shifted downwardly of the surface of said demountable roof panel;
   said stay has an abutting contact portion, against which the undersurface of said demountable roof panel may be abutted, and a mounting bracket engageable portion, with which said mounting bracket is engageable;
   said mounting bracket engageable portion of said stay includes a lateral movement control wall for controlling the movement of the mounting bracket in the direction of the inner peripheral wall of the storing space, a longitudinal movement control wall for controlling movement of the mounting bracket in a longitudinal direction of the vehicle, an upward movement control wall extended from the top portion of the longitudinal movement control wall and projected to the center of said demountable roof panel, and a mounting bracket guide wall extended from the top portion of the upward movement control wall and having an inclined surface, on which the forward end of the mounting bracket slides to move said demountable roof panel in a direction toward the roof panel holding device when the mounting bracket is urged downwardly.

7. The unit for storing a demountable roof panel as set forth in claim 3, wherein:
said demountable roof panel is provided with a mounting bracket mounted adjacent to an end portion thereof, disposed substantially parallel to the surface of said demountable roof panel and shifted downwardly of the surface of said demountable roof panel;
said stay has an abutting contact portion, against which the undersurface of said demountable roof panel may be abutted, and a mounting bracket engageable portion, with which said mounting bracket is engageable;
said mounting bracket engageable portion of said stay includes a lateral movement control wall for controlling the movement of the mounting bracket in the direction of the inner peripheral wall of the storing space, a longitudinal movement control wall for controlling movement of the mounting bracket in a longitudinal direction of the vehicle, an upward movement control wall extended from the top portion of the longitudinal movement control wall and projected to the center of said demountable roof panel, and a mounting bracket guide wall extended from the top portion of the upward movement control wall and having an inclined surface, on which the forward end of the mounting bracket slides to move said demountable roof panel in a direction toward the roof panel holding device when the mounting bracket is urged downwardly.

8. The unit for storing a demountable roof panel as set forth in claim 4, wherein:
said demountable roof panel is provided with a mounting bracket mounted adjacent to an end portion thereof, disposed substantially parallel to the surface of said demountable roof panel and shifted downwardly of the surface of said demountable roof panel;
said stay has an abutting contact portion, against which the undersurface of said demountable roof panel may be abutted, and a mounting bracket engageable portion, with which said mounting bracket is engageable;
said mounting bracket engageable portion of said stay includes a lateral movement control wall for controlling the movement of the mounting bracket in the direction of the inner peripheral wall of the storing space, a longitudinal movement control wall for controlling movement of the mounting bracket in a longitudinal direction of the vehicle, an upward movement control wall extended from the top portion of the longitudinal movement control wall and projected to the center of said demountable roof panel, and a mounting bracket guide wall extended from the top portion of the upward movement control wall and having an inclined surface, on which the forward end of the mounting bracket slides to move said demountable roof panel in a direction toward the roof panel holding device when the mounting bracket is urged downwardly.

9. A unit for storing a demountable roof panel as set froth in claim 1, wherein said roof panel holding device includes; an urging member held on an inner peripheral wall of a storing space in a manner to be movable toward said roof panel fixing device, coupled into a mounting cutout of said demountable roof panel to control the movement of said demountable roof panel in the vertical direction, and resiliently urging said demountable roof panel in the direction of said roof panel fixing device.

10. The unit for storing a demountable roof panel as set forth in claim 9, wherein said roof panel holding device includes a guide mechanism for guiding said urging member in a manner to be linearly movable toward said roof panel fixing device, and a spring for biasing said urging member in a direction of the projected forward end thereof, said urging member having a shoe coupled into the mounting cutout of said roof panel to be engaged therewith.

11. The unit for storing a demountable roof panel as set forth in claim 10, wherein said guide mechanism has a slot elongately formed in said urging member in a direction of urging and two guide pins inserted through the slot of said urging member to slidably hold said urging member on the side of the inner peripheral wall of said storing space.

12. The unit for storing a demountable roof panel as set forth in claim 11, wherein said slot is extended through said urging member in the widthwise direction relative to the moving direction of said uring member, and said two guide pins are provided in the widthwise direction of said urging member and an axial line passing through said two guide pins is disposed paralled to a moving path of said urging member.

13. The unit for storing a demountable roof panel as set forth in claim 11, wherein, out of said two guide pins, one toward said roof panel fixing device is shifted to a position higher than the other, whereby said urging member moves obliquely upwardly toward the roof panel fixing device.

14. The unit for storing a demountable roof panel as set forth in claim 11, wherein said roof panel holding device comprises a case secured to the inner peripheral wall of said storing space of a substantially U-shape in vertical cross-section, said case extends in a direction toward said roof panel fixing device, said two guide pins cross said case and are secured thereto, and said urging member is slidably coupled into said case.

15. The unit for storing a demountable roof panel as set forth in claim 12, wherein said roof panel holding device comprises a case secured to the inner peripheral wall of said storing space of a substantially U-shape in vertical section, said case extends in a direction toward said roof panel fixing device, said two guide pins cross said case and are secured thereto, and said urging member is slidably coupled into said case.

16. The unit for storing a demountable roof panel as set forth in claim 13, wherein said roof panel holding device comprises a case secured to the inner peripheral wall of said storing space of a substantially U-shape in vertical section, said case extends in a direction toward said roof panel fixing device, said two guide pins cross said U-shaped groove and are secured thereto, and said urging member is slidably coupled into said case.

17. The unit for storing a demountable roof panel as set forth in claim 11, wherein said urging member has a spring engageable stepped portion projected downwardly of said slot, and said spring is provided between said engageable stepped portion and said inner peripheral wall portion in the bottom of a case for said urging member.

18. The unit for storing a demountable roof panel as set forth in claim 12, wherein said urging member has a spring engageable stepped portion projected downwardly of said slot, and said spring is provided between said engageable stepped portion and said inner peripheral wall portion adjacent the bottom of a case for said urging member.

19. The unit for storing a demountable roof panel as set forth in claim 13, wherein said urging member has a spring engageable stepped portion projected downwardly of said slot, and said spring is provided between said engageable stepped portion and said inner peripheral wall portion adjacent the bottom of a case of said urging member.

20. The unit for storing a demountable roof panel as set forth in claim 1, wherein said stay fixing means includes a control knob and means for removably fixing said stay in said retracted position, said stay being releasable from said retracted position by rotating said stay toward said projected position, independent of direct operation of said control knob.

* * * * *